United States Patent [19]
Min

[11] Patent Number: 5,900,921
[45] Date of Patent: May 4, 1999

[54] LENS FOR DIPLOPIA AND AMBLYOPIA AND GLASSES USING THE SAME

[75] Inventor: Byung-Moo Min, Taejon, Rep. of Korea

[73] Assignee: Jong-Deok Park, Taejon, Rep. of Korea

[21] Appl. No.: 09/009,833

[22] Filed: Jan. 20, 1998

Related U.S. Application Data

[63] Continuation-in-part of application No. 08/747,977, Nov. 12, 1996, abandoned, which is a continuation of application No. 08/426,936, Apr. 21, 1995, abandoned.

[30] Foreign Application Priority Data

Jul. 6, 1994 [KR] Rep. of Korea ....................... 94-16404

[51] Int. Cl.$^6$ ....................................................... G02C 7/10
[52] U.S. Cl. ............................................... 351/44; 351/159
[58] Field of Search .................................... 351/173, 174, 351/175, 176, 159, 163

[56] References Cited

U.S. PATENT DOCUMENTS

| | | |
|---|---|---|
| 3,718,078 | 2/1973 | Plummer . |
| 3,904,281 | 9/1975 | Jampolsky . |
| 4,163,541 | 8/1979 | Campbell . |
| 4,480,894 | 11/1984 | Miller et al. . |
| 4,567,123 | 1/1986 | Ohtaka et al. . |
| 5,270,744 | 12/1993 | Portney . |
| 5,300,963 | 4/1994 | Tanaka . |
| 5,497,269 | 3/1996 | Gal . |

FOREIGN PATENT DOCUMENTS 92022000 12/1992 WIPO ..................................... 351/159

*Primary Examiner*—William L. Sikes
*Assistant Examiner*—James Dudek
*Attorney, Agent, or Firm*—Woodbridge & Associates

[57] ABSTRACT

Disclosed is a lens for treating the diplopia and amblyopia and glasses using the same including a concave and convex part wherein a concave part and a convex part are continuously and repeatedly formed on the overall surface of a lens body facing an eye ball of a person who wears the lens. Here, the concave pan has a radius of curvature of R and the convex part has a radius of curvature of r. The relation between R and r is R>>r. There is no esthetic defects ostensibly since an eye through the glasses using the lens look like a normal eye seen from the outside of the glasses and covers a normal eye on behalf of the conventional eye patch by hardly seeing an object of the outside seen from the inside of the glasses, thereby improving the eyesight of the patient suffering from the diplopia or the amblyopia.

8 Claims, 5 Drawing Sheets

5,900,921

LENS FOR DIPLOPIA AND AMBLYOPIA AND GLASSES USING THE SAME

CROSS REFERENCE TO RELATED APPLICATIONS

This continuation-in-part application claims as priority Korean Patent Application 94-16404 filed on Jul. 6, 1994 and is a continuation-in-part application of U.S. application Ser. No. 08/747,977 filed on Nov. 12, 1996, now abandoned, which, in turn, is a continuation of U.S. application Ser. No. 08/426,936 filed on Apr. 21, 1995, now abandoned. The entire disclosure of U.S. applications Ser. Nos. 08/426,936 and 08/747,977 are hereby incorporated, in total, by reference.

BACKGROUND OF THE INVENTION

1. Field of the Invention

The present invention relates to a lens specially manufactured for treatment of a diplopia and a amblyopia and glasses using the same, and particularly to a lens for remedial treatment of a diplopia and amblyopia and glasses capable of increasing an effective treatment result and enhancing satisfaction of a wearer by compensating drawbacks in that a conventionally used eye patch has caused an inconvenience to a wearer and the wearer has avoided wearing the eye patch due to the deficiency in the esthetic sense.

2. Description of the Related Art

Amblyopia is defined as dimness of sight in one eye or in both eyes without an apparent organic defect, and most of the cases, it occurs in one eye. The Amblyopia is known to be caused by the interdiction of an appropriate visual impetus indispensable for development of eye sight in the early ages by strabismus, anisometropia, a heavy abnormal refraction and the like. However, it is a kind of disease curable to normalcy when treated in an early stage. The ratio of people suffering from the disease roughly amounts to 2% to 5% of the total population.

Diplopia is defined as a condition of vision in which a single object appears double caused by a facial muscle paralysis and the like. The diplopia is known to be originated from the generation of strabismus caused by the nervous paralysis of orbit muscle resulting from the circulatory disorders such as diabetes, a high blood pressure and the like, and most of the cases, it is possible to recover from diplopia within six (6) months since the disease has occurred.

In the case of the amblyopia, the eyesight can be improved by an appropriate treatment during the period of ages 9 to 10. It is conventionally known that a good eye or a normal eye of good eyesight is covered by an eye patch not to see, so that only the eye of amblyopia can see for improvement. In the case of the diplopia, it has been a customary for a patient of diplopia to wear the eye patch for improving the diplopia.

However, there are some problems and inconveniences in the method of covering the eye by using the eye patch as follows.

First, the eye patch should be periodically replaced due to the collection of the secretion at the inner surface of the eye patch where the eye contacts, and especially the case is worsened when the eye patch should be worn for a lifetime in case of amblyopia caused by a traumatic injury because the symptom of the amblyopia remains even after the surgery.

Second, the eye patch is frequently removed for reasons of its external appearance and lack of the esthetic look on the face, especially in the case of a child patient, thereby decreasing the remedial cooperation from the patient and lowering the curative effect.

Third, an eruption, dermatitis or an itchy symptom on a facial area is occasionally appeared caused by the adhesive tape for attaching the eye patch to the face.

SUMMARY OF THE INVENTION

Therefore, it is an object of the present invention to provide a lens for a diplopia and an amblyopia and glasses using the same, which has no esthetic defects ostensibly since an eye through the glasses using the lens look like a normal eye seen from the outside of the glasses and covers a normal eye on behalf of the conventional eye patch by hardly seeing an object of the outside seen from the inside of the glasses, thereby improving the eyesight of the patient suffering from the diplopia or the amblyopia.

According to one aspect of the present invention, a lens for treating the diplopia and amblyopia includes a concave and convex part wherein a concave part and a convex part are continuously and repeatedly formed on the overall surface of a lens body facing an eye ball of a person who wears the lens. Here, the concave part has a radius of curvature of R and the convex part has a radius of curvature of r. The relation between R and r is R>>r. Preferably, the radius of curvature r of the convex part is zero (0).

Moreover, the radius of curvature of the concave part in the concave and convex part is controlled by a coated surface of liquid optical material capable of being hardened. Preferably, at the outer surface of the lend body, a non-reflecting multi-coated surface is formed.

According to another aspect of the present invention, there is the concave and convex part in which the concave part and the convex part are continuously and repeatedly formed on the overall surface of the lens body facing an eye ball of a person who wears the lens. Here, the radius of curvature of the concave is R, and that of the convex is r. A lens having the relation R>>r is put in one lens rim of the glasses, and a conventional lens is put in the other rim of the glasses.

Preferably, an upper side blocking unit and a lower side blocking unit are arranged around the upper part and lower part of the lens rims of the glasses. Moreover, a lateral blocking unit is formed at a connecting portion to the temples.

Moreover, the upper side blocking unit and the lower side blocking unit are integrally formed with the lens rims, and the lateral blocking unit is integrally formed with the temples. Preferably, the width of the lateral blocking unit is set equal over the entire temples.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

Figure 1:
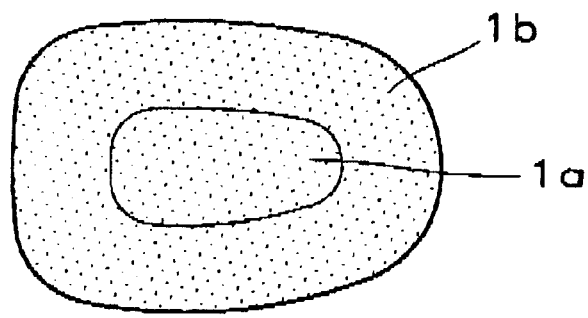
FIG. 1 is a conventional eye patch on the market.
Figure 2:
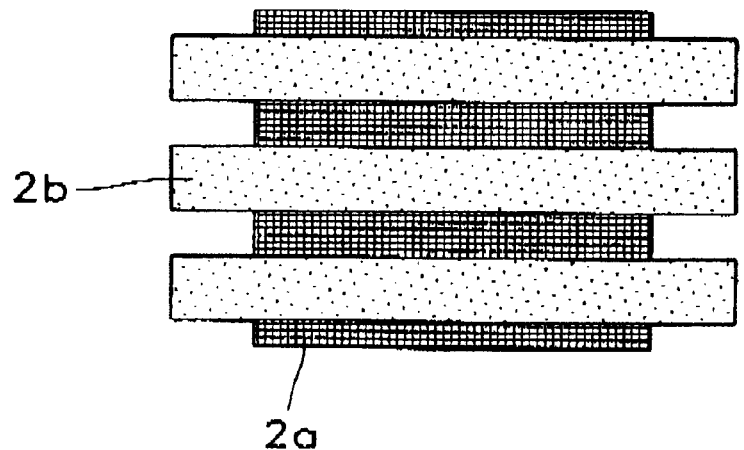
FIG. 2 is an eye patch made of a conventionally used gauze.

FIG. 1 shows a gauze 1a and a tape 1b of a conventional eye patch on the market. FIG. 2 shows an eye patch which is conventionally used. A gauze 2a covers the eye and the eye patch is attached to the face with a tape 2b.

Figure 3A:
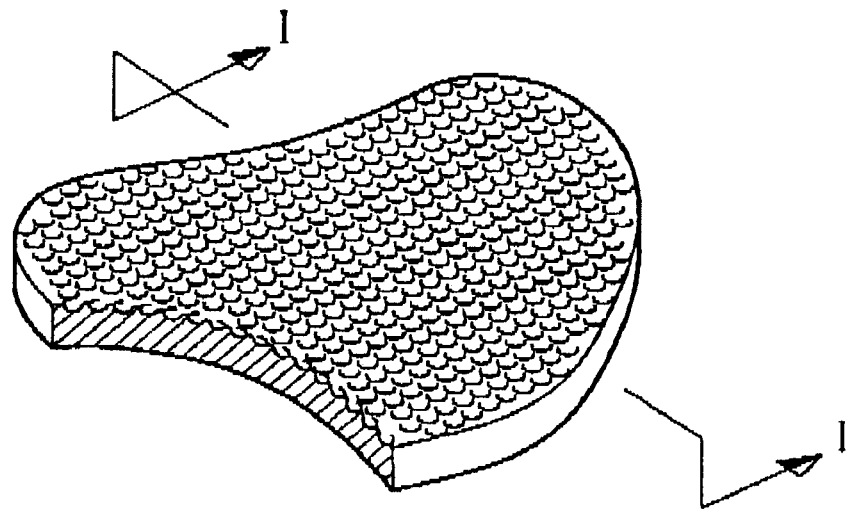
FIG. 3A is a perspective view which is partly cut illustrating a lens according to the present invention.
Figure 3B:
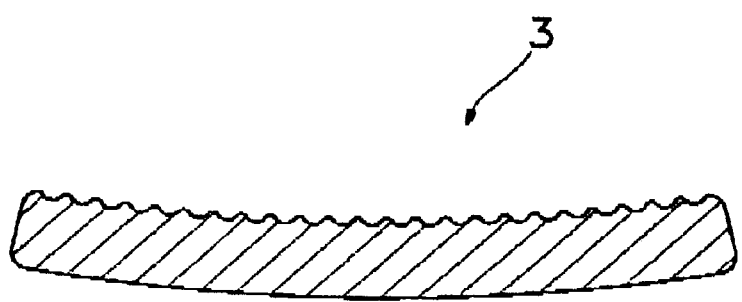
FIG. 3B is a sectional view cut along a line I-I'.
Figure 4A:
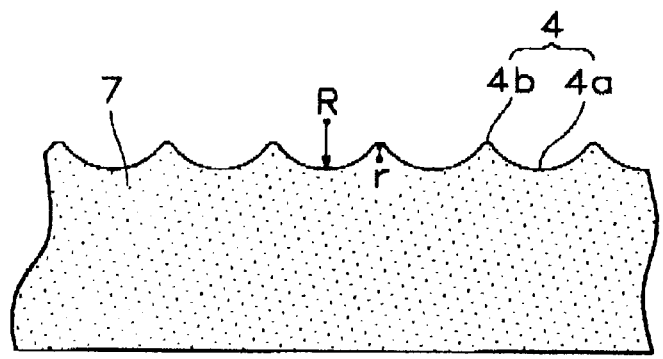
FIG. 4A is an enlarged sectional diagram specifically illustrating the lens of FIGS. 3A and 3.
Figure 4B:
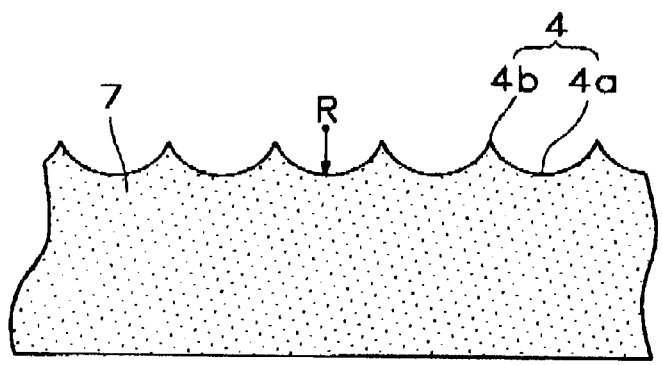
FIG. 4B is an enlarged sectional diagram illustrating another embodiment.

FIGS. 3A and 3B are views illustrating an embodiment of a lens for treating a diplopia and an amblyopia according to the present invention. Here, FIG. 3A is a perspective view whose one side is cut and FIG. 3B is a sectional view which is cut along a line I-I'. Moreover, FIG. 4A is an enlarged sectional diagram specifically illustrating FIGS. 3A and 3B, and FIG. 4B is an enlarged sectional diagram illustrating another embodiment.

Referring to FIGS. 3A and 3B, a minute concave and convex part wherein a concave part and a convex part are continuously and repeated arranged is evenly formed over the entire surface of the inner side of the lens body, which faces an eye ball of a wearer.

The shape of the concave and convex part is specifically explained with reference to FIGS. 4A to 4C. The concave and convex part 4 wherein a concave part 4a and a convex part 4b are continuously and repeatedly formed on the overall surface of the lens body 7 facing the eye ball of the person who wears the lens. The concave part 4a has a radius of curvature of , and the convex part 4b has a radius of curvature of r. At this time, the relation between the radius of curvature R of the concave part 4a and the radius of curvature r of the convex part 4b is R>>r.

As a preferred embodiment, the radius of curvature of the convex part 4b is zero (0). As shown in FIG. 4B, only the concave part 4a is continuously formed.

In order to form the concave and convex part 4 over the entire surface of the lens body 7, it is important to control each radius of curvature R and r of the concave part 4a and the convex part 4b of the concave and convex part 4.

Conventionally, it is possible to process the lens on which the concave and convex part 4 can be formed over the entire surface through minute mechanical processing or grinding the surface of the mold for processing the casting which manufactures the lens using glass or plastic, or etching with chemical material.

However, to form the concave and convex part on the overall surface of the lens body using the aforesaid method and to control the radius of curvature of each concave part and the convex part are very difficult in various aspects, such as a material of the mold and a method of process.

Figure 4C:
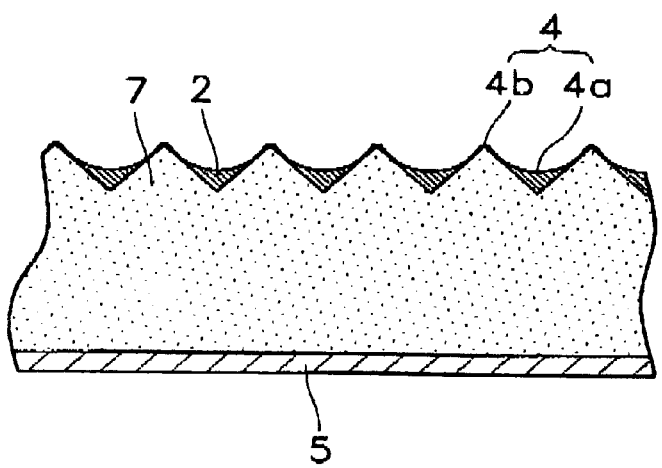
FIG. 4C is an illustrative view showing one embodiment explaining the formation of a concave and convex part of a lens according to the present invention.

Referring to FIG. 4C, a method of forming the concave and convex part according to an embodiment of the present invention is explained. The concave and convex part which is previously sharp and rough is formed to have the concave part and the convex part which are arranged continuously and repeatedly using the mold which is formed on the surface through the conventional methods of grinding, sanding, etching, etc. After that, a coated film 2 is formed through dipping or spinning the liquid material which is capable of being hardened and is optically transparent. At this time, by controlling the coated amount properly, it is possible to control the radius of curvature of the concave part easily and properly by the surface tension of the liquid material.

In the embodiment, the concave and convex part 4 is formed at the inner surface of the lens body 7 facing the eyeball of the wearer. However, it is possible to obtain the same effect when the concave and convex part 4 is formed at the outer surface of the lens body 7. Of course, in this case, the radius of curvature of the convex part is large, and that of the concave part is small.

Moreover, as shown in FIG. 4C, it is preferably to form a non-reflecting multi-coated surface 5 using an oxidized Zirconium or an oxidized silicon ($SiO_2$) at the outer surface of the lens body 7.

The scattering of light is generated on the surface on which the concave and convex part 4 is formed (hereinafter, referred to as an uneven surface), thereby causing an image of the object to be obscured, so that the outside object cannot be seen from the eyeball side but the eyeball can be clearly seen from the outside.

Figure 7A:
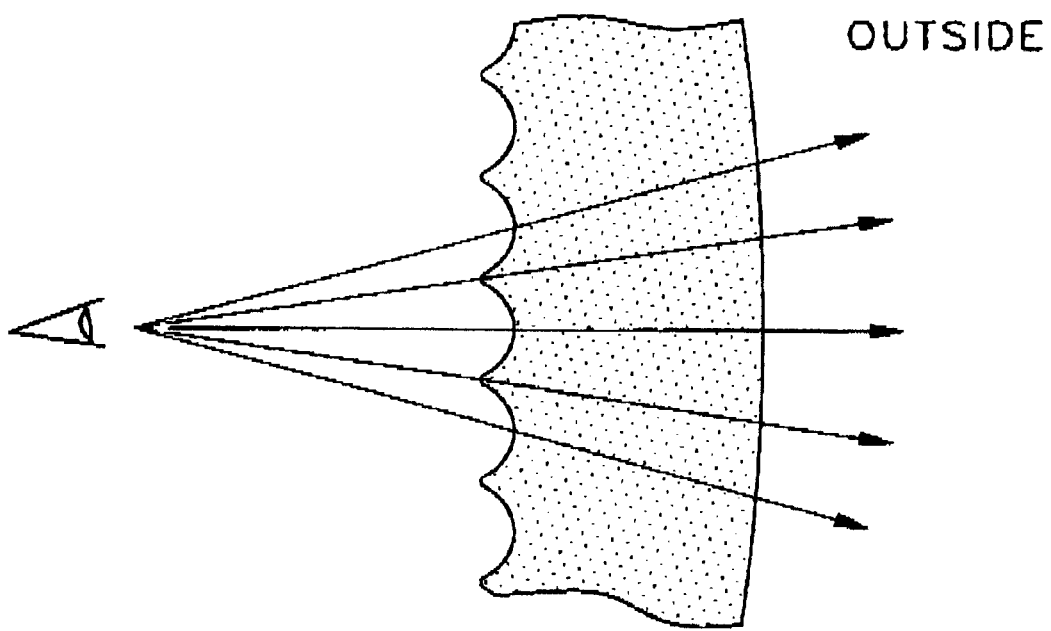
FIG. 7 is an illustrative view explaining the operational principle of the present invention.

This principle of this effect is specifically explained with reference to FIGS. 7A and 7B. Referring to FIG. 7A, as the image of the eyeball of the wearer is located within a short distance from the uneven surface, when the light transmitted from the eyeball of the wearer passes through the uneven surface of the lens body, it is incident almost vertical to the tangential line of the curved surface of the concave part in the concave and convex part within a predetermined angle. In other words, the refraction is very small as the incidence angle is very small around zero (0), the light travels straight. Accordingly, in the case that a person who is located at a distance from the uneven surface sees the eyeball of the person who wears the glasses, the image of the eyeball is seen normally without being refracted.

Figure 7B:
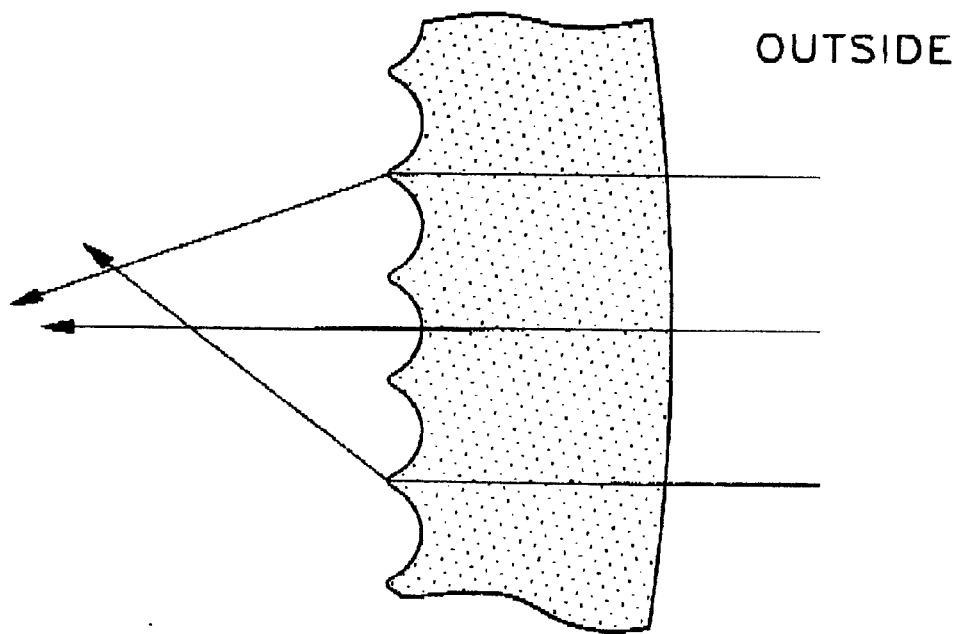

On the contrary, referring to FIG. 7B, as the image of the outside object is located at a distance from the uneven surface, in the case that the light received from the outside in form of parallel light passes through the uneven surface of the lens body, the light is transmitted in various incidence angles, thereby causing the light to be scattered. Accordingly, as the image of the outside object is not clearly seen at the eyeball of the wearer, the image of the outside object cannot be seen.

As described above, the eyeball of the wearer is clearly nearly seen from the outside but the wearer nearly cannot see the outside object.

Moreover, the non-reflecting multi-coated film can be formed at the surface of the lens body 7. When the non-reflecting multi-coating is not performed, assuming that the refractive index n of the lens body 7 is 1.5, a reflection factor at an outside surface of the lens can be given as, $$(1-n/1+n)^2 \times 100\% = 4\%$$

At this time, a reflection factor at an inside surface of the lens is also 4%. Accordingly, the lens looks obscure due to the reflection and scattering formed at the inner surface of the lens body when viewed toward the eyes from the outside of the lens. At this time, the non-reflecting multi-coating can eliminate this kind of reflection and prevent the scattering, thereby allowing a clear view of the eyeball from the outside of the lens.

Figure 5:
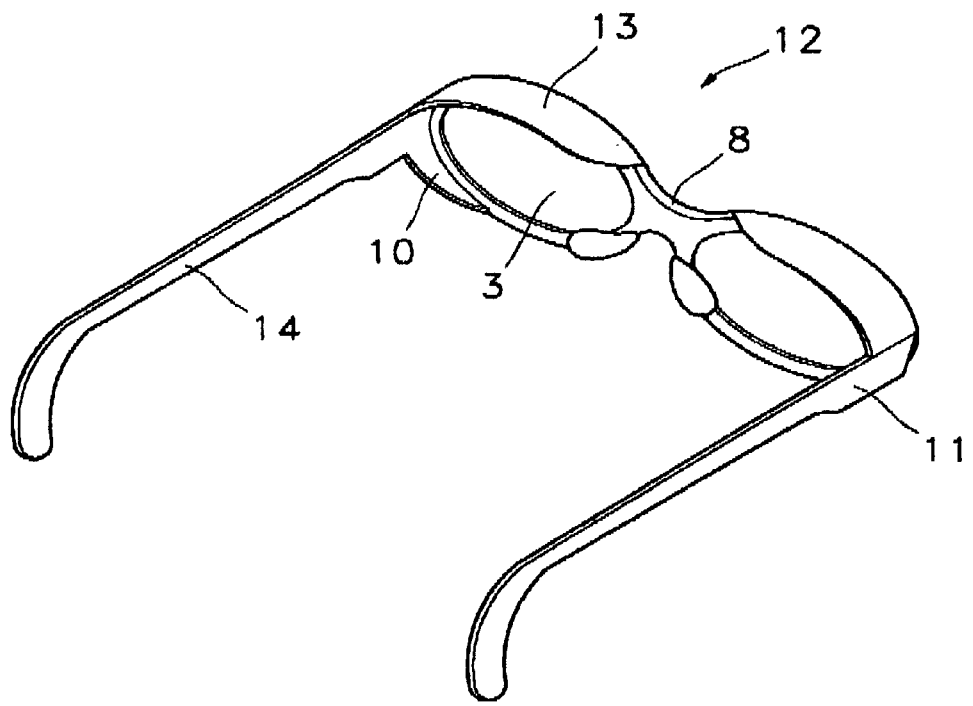
FIG. 5 is a perspective view illustrating glasses according to the present invention.
Figure 6:
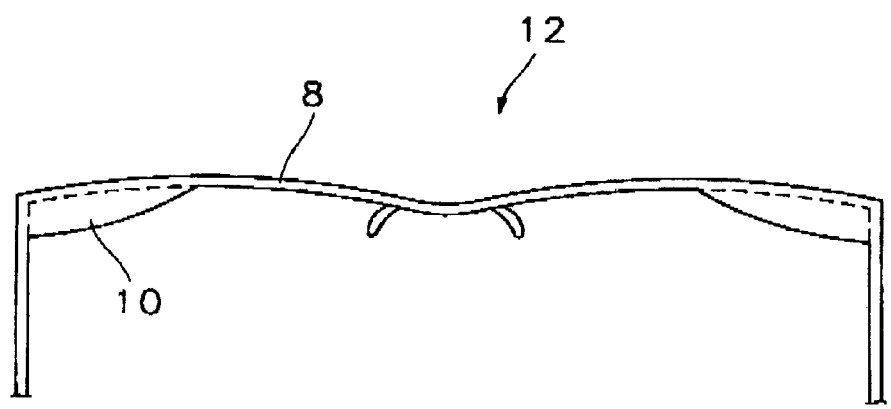
FIG. 6 is a plain view illustrating glasses according to the present invention.

FIGS. 5 and 6 are a perspective view and a plain view of the glasses to which the lens according to the present invention is applied. As shown in the drawings, the lens of the present invention is put in one lens rim of the glasses and the conventional lens made of an ordinary glass or plastic material of no degrees is put in the other lens rim. Moreover, as shown in FIG. 5, at the upper side blocking unit 10 and the lower side blocking unit 13 are arranged at the upper side and the lower side of the lens rims 8, respectively. By locating the lateral blocking unit 11 having a predetermined width at the connecting portion to the lens rim 8 of the temple 14, the outside object can be seen only through the lens, thereby enhancing the efficiency of the medical treatment.

The upper side blocking unit 10 and the lower side blocking units 13 can integrally be manufactured with the lens rim 8. After firstly manufacturing the lens rim 8, the upper side blocking unit 10 and the lower side blocking unit 13 can be separately attached to the lens rim 8. Sizes of the blocking units should be large enough to keep the wearer from seeing the outside object by squinting at. Moreover, the lateral blocking unit 11 can be integrally manufactured with the temple 14. At this time, it is possible to manufacture the lateral blocking unit 11 with a predetermined width, or to manufacture the entire temple 14 with a predetermined width. Moreover, if necessary, a certain tint can be added to the lens.

When the amblyopia is treated with glasses of the lens, a lens of no degree in the case of no refraction, or a lens of an appropriate degrees in the case of refraction is worn by the eye of the amblyopia, and the lens according to the present invention is worn on the eye of the normal eyesight. Further more, in order to treat the diplopia, when both eyes have the same eyesight, any eye can, be worn by the lens of the present invention, and when the eyesight of the both eyes is different, the lens according to the present invention is worn on the eye of the bad eyesight. In both cases described above, the lens according to the present invention prevents the eye from seeing the objects, thereby causing the wearer thereof to obtain the same effect as wearing the eye patch. Furthermore, the eye wearing the lens of the present invention is well viewed from the outside, so that the esthetic defects of the conventional eye patch can be eliminated to thereby increase the treatment cooperation from the patient.

The treatment result by way of the glasses put in the lens according to the present invention for the patient suffering from the amblyopia or diplopia can be found as follows.

Amblyopia Treatment

Among 49 patients who have shown no remedial values against the amblyopia due to the poor cooperation to the conventional eye patch treatment, 35 patient (71.4%) have registered the eyesight improvement of 2.54±1.43 lines by Snellen acuity after three months of wearing the glasses fitted with the lens according to the present invention. A group who has registered one (1) line in the eyesight improvement was numbered 10 (20.4%); a group of two (2) lines numbered 10 (20.4%); a group of three (3) lines numbered 6 (12.2%); a group of four (4) or more lines numbered 9 (18.2%) and a group who has shown no improvement in the eyesight was counted 14 (28.5%).

In a satisfaction test, a subjective satisfaction was 85.8% while an objective satisfaction was 95.2%, which represent that wearing of the glasses of the lens according to the present invention has provided an esthetic effect to both the patients and protectors thereof.

The degree of the eyesight improvement according to the subjective satisfaction in a group who responded as 'very good', 'good', and 'so so' has respective eyesight improvements of 3.88±5.61 lines (P<0.05), 0.95±0.95 lines (P<0.01) and 0.67±0.86 lines (P<0.05), whereas the degree of the improvement in the group who responded as 'bad' improvement of 0.43±0.67 lines (P>0.05).

This means that the group of favorable responses has marked a significant improvement of the eyesight compared with that of the negative responses.

The degree of the eyesight improvement per age group differs. A group of less than four (4) had an improvement of 2.67±2.3 lines; a group of more than four (4) and less than seven (7) had an improvement of 1.71±1.38 lines; and a group of above seven (7) showed an improvement of 1.64±2.31 lines. In other words, the group of less than four (4) has shown the most outstanding improvement result (P<0.05). In the eyesight improvement with regard to causes leading to amblyopia, a group of strabismic amblyopia showed an improvement of 3.10±5.76 lines; a group of anisometropic amblyopia had an improvement of 1.52±1.73 lines, and a group of visual deprivation amblyopia registered an improvement of 0.82±6.42 lines. In other words, groups of strabismic amblyopia and anisometropic amblyopia represented the outstanding improvements.

Diplyopia Treatment

As a result of the treatment to ten (10) adults who suffered from diplopia by having them wear the glasses of lens according to the present invention, the ten (10) adults all were cured of the diplopia and all expressed the satisfaction with regard to the outward appearance involved in wearing the glasses.

As described, it can be seen that the glasses using the lens for diplopia and amblyopia according to the present invention has increases the treatment effect and improved the wearer's satisfaction thereof, and has made up for the week points in that there have been inconveniences involved in wearing an eye patch or occluder conventionally used for the treatment of the amblyopia or the diplopia and cases of avoiding wearing the eye patch due to the esthetic deficiency, thereby decreasing the curative value.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A lens for treating a diplopia and an amblyopia comprising:

> a concave and convex part wherein a concave part and a convex part are continuously and repeatedly formed on the overall surface of a lens body facing an eyeball of a person who wears the lens,
>
> wherein said concave part has a radius of curvature of R and said convex part has a radius of curvature of r, and the relation between said R and r is R>r.

2. The lens of claim 1, wherein the radius of curvature r of said convex part is zero (0).

3. The lens of claim 1, wherein the radius of curvature R of said concave part in said concave and convex part is controlled by a coated surface of liquid optical material capable of being hardened.

4. The lens of claim 1, wherein at the outer surface of the lens body, a non-reflecting multi-coated surface is formed.

5. Glasses using the lens for the diplopia and amblyopia of claim 1, wherein one side of the lens rims is fitted with the lens of claim 1, while the other side of the lens rims is equipped with a conventional lens.

6. The glasses of claim 5, wherein an upper side blocking unit and a lower side blocking unit are arranged around the upper part and lower part of the lens rims of the glasses, and a lateral blocking unit is formed at a connecting portion to temples.

7. The glasses of claim 6, wherein said upper side blocking unit and said lower side blocking unit are integrally formed with said lens rims, and said lateral blocking unit is integrally formed with said temples.

8. The glasses of claim 7, wherein the width of said lateral blocking unit is set equal over the entire temples.

* * * * *